Figure 1:
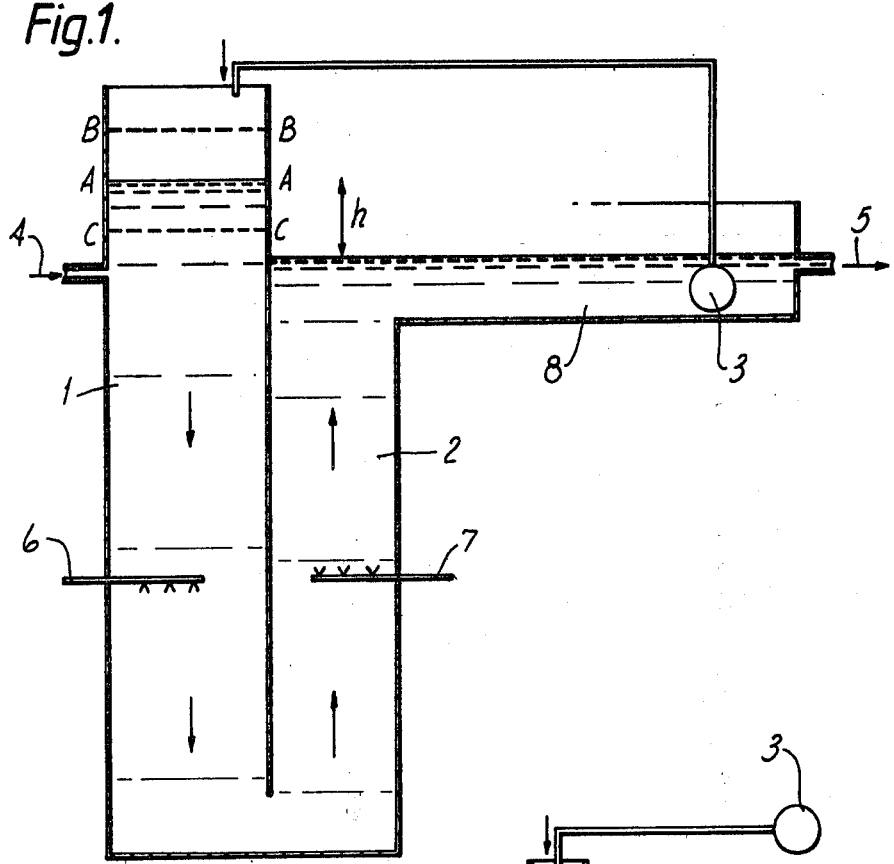

United States Patent [19]

Hines

[11] 4,304,665
[45] Dec. 8, 1981

[54] PROCESS FOR TREATMENT OF WASTEWATER

[75] Inventor: David A. Hines, Stockton-on-Tees, England

[73] Assignee: Imperial Chemical Industries Limited, London, England

[21] Appl. No.: 109,905

[22] Filed: Jan. 7, 1980

[30] Foreign Application Priority Data

Jan. 15, 1979 [GB] United Kingdom ............... 01346/79

[51] Int. Cl.³ .............................................. C02F 1/72
[52] U.S. Cl. ................................... 210/194; 210/220; 261/121 R
[58] Field of Search ............... 210/14, 15, 63 R, 63 Z, 210/629, 758, 765, 194, 195.1, 205, 204, 218, 220, 221.2; 261/77, 119 R, 121 R, 120, DIG. 5, DIG. 70

[56] References Cited

U.S. PATENT DOCUMENTS

| | | | |
|---|---|---|---|
| 3,696,929 | 10/1972 | Shah | 210/63 R |
| 3,840,216 | 10/1974 | Smith et al. | 210/63 R |
| 3,945,918 | 3/1976 | Kirk | 210/63 Z |
| 4,086,160 | 4/1978 | Roesler | 210/14 X |
| 4,207,180 | 6/1980 | Chang | 210/14 X |
| 4,230,563 | 10/1980 | Roesler | 210/629 |
| 4,253,949 | 3/1981 | Hines et al. | 210/194 X |

OTHER PUBLICATIONS

Speece, "U-Tube Stream Reaeration", *Public Work*, Aug. 1969, pp. 111–113.
Speece et al., "Design of U-Tube Aeration Systems", *Journal of the Sanitary Eng. Div.*, ASCE, Jun. 1970, pp. 715–725.

Primary Examiner—Thomas G. Wyse
Attorney, Agent, or Firm—Cushman, Darby & Cushman

[57] ABSTRACT

A method and apparatus for treating wastewater by circulating it around a system comprising a downcomer and a riser communicating with each other at their lower ends, the level of the wastewater in the downcomer being above the level of the wastewater in the riser and providing a hydrostatic pressure head which causes circulation of the wastewater around the system, supplying a gas containing free oxygen to the wastewater as it passes through the downcomer, and pumping the wastewater up from, or from near, the top of the riser to a part of the downcomer, at or near the top thereof, which has, for at least a part of its length, a cross-sectional area which is less than the cross-sectional area of the remainder of the downcomer below the said part.

6 Claims, 6 Drawing Figures

PROCESS FOR TREATMENT OF WASTEWATER

This invention relates to the treatment of liquid-borne biologically-degradable waste material, hereinafter referred to as wastewater, which term is to be understood to include all types of biologically degradable domestic and industrial waste materials, for example normal domestic sewage, the effluents produced by farms, food factories and other industries producing such waste.

The methods generally employed in the treatment of wastewater comprise essentially a primary treatment by physical methods such as screening and sedimentation to remove large suspended solids followed by a secondary treatment by biological methods to remove organic materials. The present invention relates to a secondary treatment stage.

The present invention provides a method for the treatment of wastewater which comprises the steps of circulating the wastewater around a system comprising a downcomer and a riser communicating with each other at their lower ends, the level of the wastewater in the downcomer being above the level of the wastewater in the riser and providing a hydrostatic pressure head which causes circulation of the wastewater around the system, supplying a gas containing free oxygen to the wastewater as it passes through the downcomer, and pumping the wastewater up from, or from near, the top of the riser to a part of the downcomer, at or near the top thereof, which has, for at least a part of its length, a cross-sectional area which is less than the cross-sectional area of the remainder of the downcomer below the said part. Preferably gas is disengaged from the wastewater before and/or during pumping from the riser to the downcomer.

The present invention also provides an apparatus for the treatment of wastewater, comprising a downcomer and a riser communicating with each other at their lower ends, means for supplying a gas containing free oxygen to the wastewater as it passes through the downcomer, means for pumping the wastewater up from, or from near, the top of the riser to a part of the downcomer, at or near the top thereof, in which the level of the wastewater is above the level of the wastewater in the riser and which has, for at least part of its length, a cross-sectional area which is less than the cross-sectional area of the remainder of the downcomer below the said part. Preferably, means are provided for disengaging gas from the wastewater before and/or during pumping from the riser to the downcomer.

Figure 4:
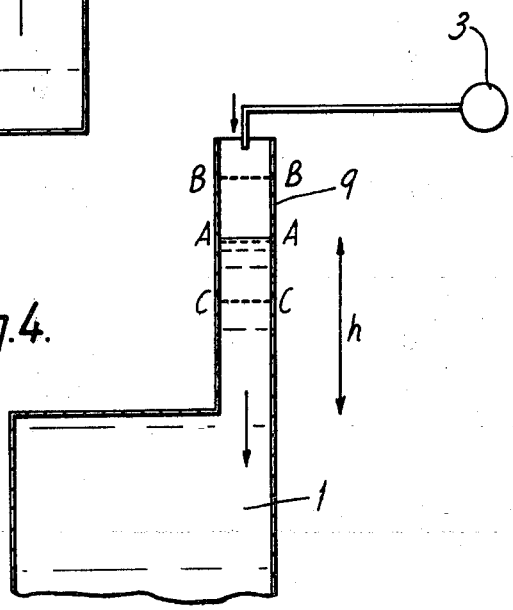
Figure 2:
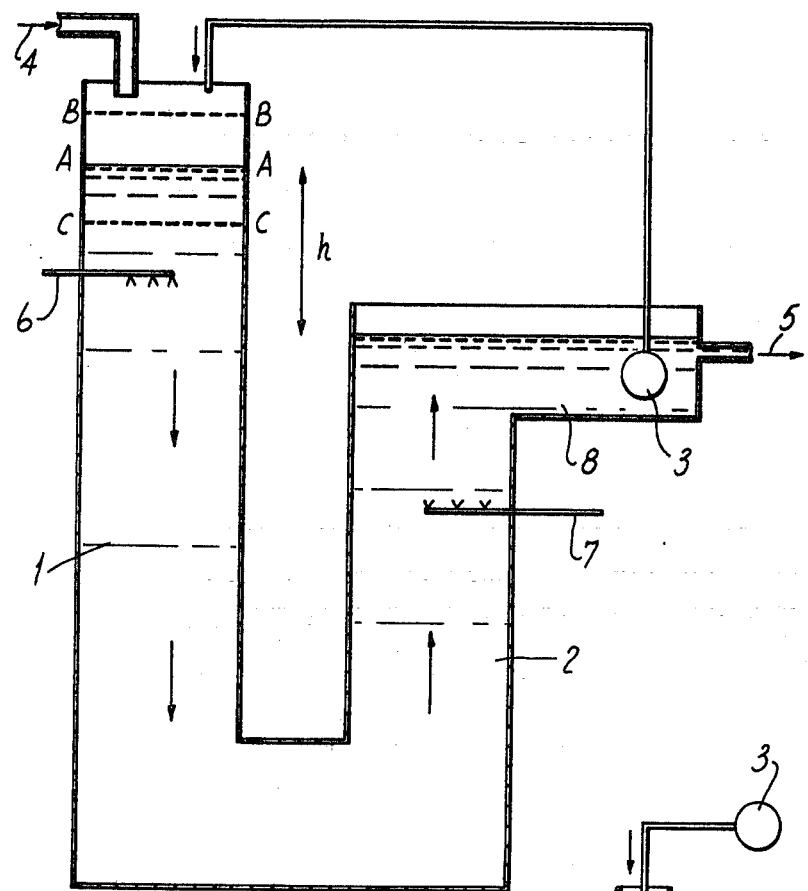
Figure 5:
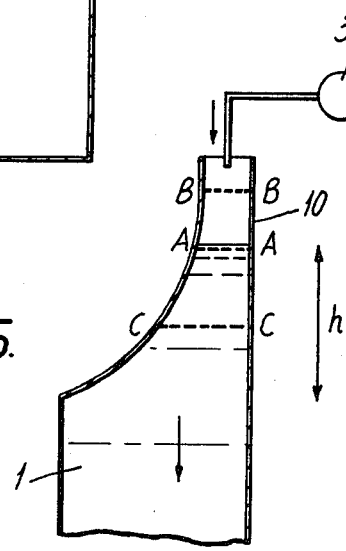
Figure 3:
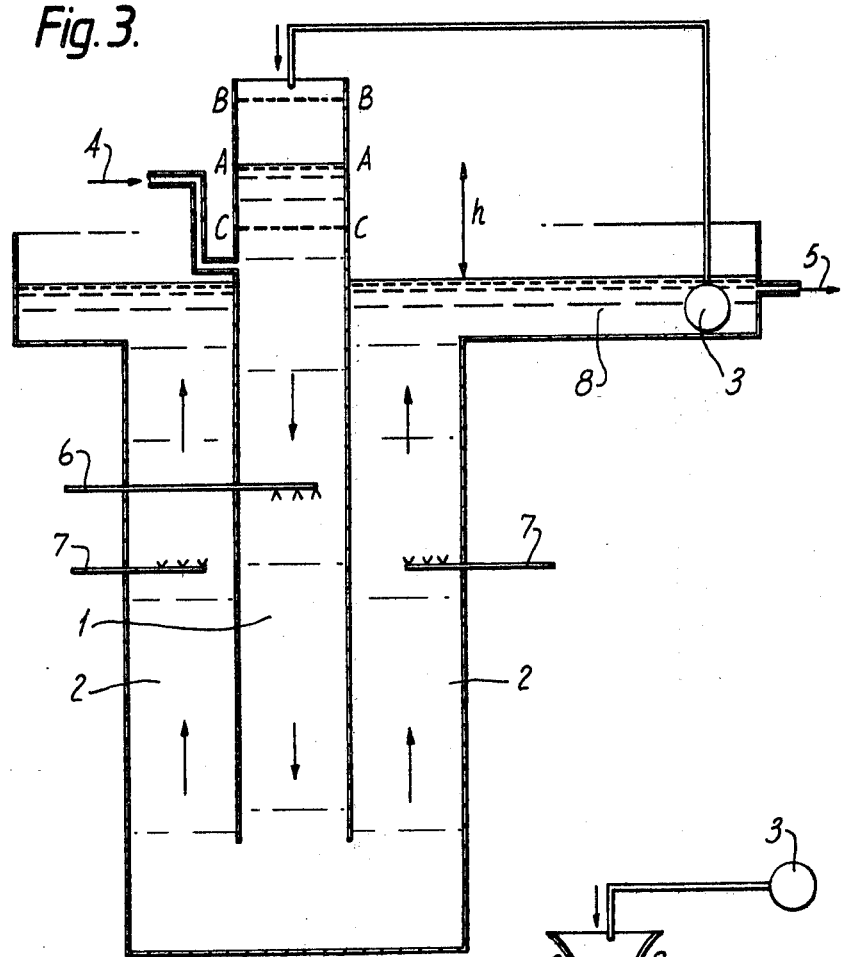
Figure 6:
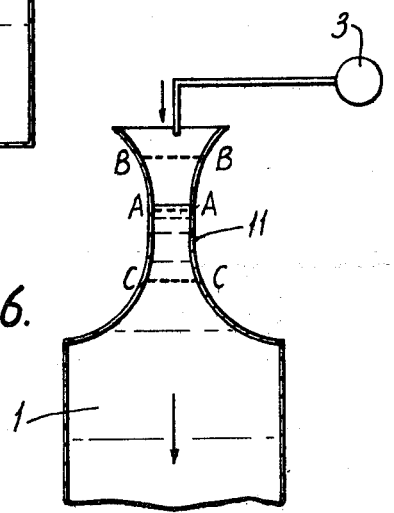

In the accompanying drawings,

FIGS. 1, 2 and 3 illustrate, diagramatically, the kind of apparatus for the treatment of wastewater (prior to modification) suitable for use in the present invention, while FIGS. 4, 5 and 6 illustrate, diagramatically, some of the modifications which may be made thereto in accordance with the invention.

As illustrated in FIGS. 1, 2 and 3, the apparatus comprises a downcomer 1, a riser 2, and a pump 3 which recirculates wastewater from, of from near, the top of the riser 2 to the downcomer 1, at or near the top thereof. Wastewater to be treated is introduced into the apparatus (preferably into the downcomer 1) at any desired rate at a convenient point 4, and after being recirculated around the apparatus many times treated wastewater is removed from the apparatus at substantially the same rate at any convenient point 5.

A gas containing free oxygen (for example air) is supplied to the downwardly flowing wastewater in the downcomer 1 at such a rate and at one or more convenient points such that it is substantially all entrained by the downwardly flowing wastewater. Preferably the gas is introduced into the downcomer 1 at a point between the top of the downcomer and a point about six-tenths of its length from the top of the downcomer. A gas containing free oxygen, for example air, may also be introduced into the riser 2, for example at 7.

Preferably, means are provided for disengaging gas from the wastewater before and/or during pumping from the riser 2 to the downcomer 1. For example, the riser 2 may be of enlarged cross-section, at or near the top thereof, forming a gas-disengagement zone 8, e.g. a tank or the like, which may be considered as part of the riser, and in which most of the gas bubbles become disengaged from the wastewater and escape to the atmosphere before the wastewater reaches the pump 3. It is stressed that although it is necessary to disengage gas bubbles from the wastewater before it passes to the downcomer, it is not essential to provide a tank or other specific means for this purpose. If the pump is of a suitable type, eg an archimedean screw pump, gas disengagement will occur if the wastewater is pumped up directly from the riser 2 to the downcomer 1.

The pump 3 may be of any type suitable for pumping the wastewater up from the tank or the like 8 to the downcomer 1 at a substantially fixed rate. Examples of suitable pumps are centrifugal pumps, axial flow pumps, and archimedean srew pumps. The latter have the added advantage of causing further disengagement of gas bubbles from the wastewater.

Under normal operating conditions, the level A—A of the wastewater in the downcomer 1 is at a substantially constant height above the level of the wastewater in the riser 2, (or above the level of the wastewater in the tank 8, if this tank if provided), so that there is a substantially constant hydrostatic pressure difference or head h between the two, which causes the wastewater to flow down the downcomer 1 and up the riser 2. There may be occasional minor and temporary variations in the head h, caused for example by minor and temporary variations in the rate of flow of the wastewater around the apparatus, but these usually rectify themselves sufficiently rapidly to cause no undue disturbance of the flow pattern.

On occasions, however, such variations do not rectify themselves, or do not rectify themselves rapidly, and the variations become progressively larger causing serious disturbance of the flow pattern. Let us suppose that the rate of flow of wastewater around the system starts to decrease due, for example, to a sudden increase in the rate of introduction of air into the downcomer 1 at 6. This increases the voidage in the downcomer 1 (namely the proportion of air bubbles to liquid) and slows down the rate of flow of the wastewater around the system, possibly to the point where the downwardly flowing wastewater in the downcomer 1 is unable to entrain the air bubbles and carry them down and carry them down and into the riser 2. At this stage, the air bubbles may float to the top of the downcomer 1. While this slowing down process is taking place, however, the level of the wastewater in the downcomer 1 is gradually rising (since the flow rate is slower and the pump 3 is continuing to pump wastewater into the downcomer 1), with a corresponding increase in the hydrostatic head h, until it reaches a level B—B where the increased head is sufficient to speed up the wastewater flow rate and restore it to is usual value. However, it takes time for the level to rise from A—A to B—B. Meanwhile the wastewater flow rate is continuing to slow down, and the longer this condition remains unrectified, the higher the level B—B will have to be. If the rise in the level from A—A to B—B (i.e. the increase in the hydrostatic head h) could be made much more rapid, then the wastewater flow rate would be restored to normal much more rapidly. Ideally, one would wish the wastewater level at the top of the downcomer 1 to respond instantaneously to any reduction in the wastewater flow rate.

Once the normal flow rate has been restored, the wastewater level will gradually sink back from B—B to its normal level A—A.

On the other hand, let us suppose that for some reason the wastewater flow rate starts to increase beyond its normal rate (e.g. if the supply at 6 is reduced or cut off altogether). In this case, the level A—A will begin to fall, with a corresponding decrease in the hydrostatic head h, until it reaches a new level C—C at which point the hydrostatic head is so reduced that the wastewater flow rate is slowed down again to its normal level. However, it takes time for the level to sink from A—A to C—C, particularly since the pump 3 is striving to maintain in the level A—A, and the more rapidly one can achieve this change in levels (i.e. the more rapidly one can achieve a reduction in the hydrostatic head h) the more rapidly the normal wastewater flow rate is restored. Once this has been done, the wastewater level will gradually rise from C—C to its normal level A—A.

We have now found that a very much more rapid response to variations in the wastewater flow rate can be achieved if a part of the downcomer 1, above the level of wastewater in the tank 8, has, for at least a part of its length, a cross-sectional area which is smaller than that of the remainder of the downcomer therebelow. This is illustrated in FIGS. 4, 5 and 6 which show the uppermost portion of the downcomer 1 modified in this manner.

If one refers to FIG. 4, for example, it will be seen that the cross-sectional area of the uppermost portion 9 of the downcomer 1 is only (very approximately) one-tenth of the cross-sectional area of the corresponding portions in FIGS. 1, 2 and 3. If, therefore, in FIGS. 1, 2 and 3 it takes, for example, ten seconds for the level A—A to rise to the level B—B or higher (or to sink to the level C—C or lower), in FIG. 4 it will take only about one second to achieve the same effect. This much more rapid increase (or decrease) in the hydrostatic head h means that any decrease (or increase) in the wastewater flow rate around the apparatus will be rectified and normal conditions restored that much more quickly.

In FIGS. 5 and 6, the uppermost portion 10 and 11 respectively of the downcomer 1 is shaped somewhat differently from that in FIG. 4, but as in FIG. 4 the response to variations in the wastewater flow rate around the apparatus will be much more rapid than in FIGS. 1, 2 and 3, though the reponse to an increase in this rate will be somewhat slower in FIG. 5 than the response to a decrease in this rate, since the cross-sectional area at the level C—C is greater than the cross-sectional area at the level B—B. However, the response in each of FIGS. 4, 5 and 6 is more rapid than in any of FIGS. 1, 2 and 3.

I claim:

1. Apparatus for the treatment of wastewater, comprising a riser having a wastewater level therein:

a downcomer, having a wastewater level therein, communicating at its lower end with the riser, and having an upper part which has for at least part of its length a cross-sectional area which is less than the cross-sectional area of the rest of the downcomer below the upper part;

means for providing a hydrostatic pressure head for effecting circulation of wastewater through the downcomer-riser system, said means including means for maintaining the level of wastewater in said downcomer in said downcomer upper part, and above the level of wastewater in said riser;

means for supplying a gas containing free oxygen to the wastewater as it passes through the downcomer-riser system; and means for effecting rapid rectification of variations in the pressure head, said means comprising means for pumping wastewater up from an upper part of said riser to said lower cross-sectional area upper part of said downcomer.

2. Apparatus as recited in claim 1 wherein said downcomer and riser communicate only at their lower ends apart from said means for pumping wastewater from an upper part of said riser to said lower cross-sectional area upper part of said downcomer.

3. An apparatus as claimed in claim 1, including means for disengaging gas from the wastewater before and/or during pumping of the wastewater from the riser to the downcomer.

4. An apparatus as claimed in claim 3, including a gas-disengaging tank or the like into which wastewater passes from the riser and from which it is pumped to the downcomer.

5. An apparatus as claimed in claim 1, wherein said pumping means comprises means for pumping the wastewater from the riser to the downcomer at a substantially fixed rate.

6. An apparatus as claimed in claim 1, wherein the said pumping means comprises an archimedean screw pump.

* * * * *